(12) United States Patent
Chiang

(10) Patent No.: US 7,986,856 B2
(45) Date of Patent: Jul. 26, 2011

(54) METHOD AND APPARATUS FOR INCREASING BRIGHTNESS OF IMAGE CAPTURED IN LOW LIGHT

(75) Inventor: Shou-Chih Chiang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 909 days.

(21) Appl. No.: 11/946,343

(22) Filed: Nov. 28, 2007

(65) Prior Publication Data
US 2009/0034872 A1   Feb. 5, 2009

(30) Foreign Application Priority Data
Aug. 3, 2007   (CN) .................. 2007 1 0201271

(51) Int. Cl.
G06K 9/36   (2006.01)
G03F 3/08   (2006.01)

(52) U.S. Cl. ...................................... 382/276; 358/521

(58) Field of Classification Search .............. 382/162, 382/260, 262, 274–276, 305, 312; 345/604, 345/605; 358/2.1, 521, 516
See application file for complete search history.

(56) References Cited

U.S. PATENT DOCUMENTS

| | | | |
|---|---|---|---|
| 4,930,009 A * | 5/1990 | Shiota | 358/506 |
| 5,042,078 A * | 8/1991 | Oshikoshi et al. | 382/167 |
| 6,458,492 B1 * | 10/2002 | Kraft | 430/4 |
| 6,696,232 B2 * | 2/2004 | Sowinski | 430/506 |
| 6,839,151 B1 * | 1/2005 | Andree et al. | 358/2.1 |
| 7,181,087 B2 | 2/2007 | Kang et al. | |
| 7,486,413 B2 * | 2/2009 | Eliav et al. | 358/1.2 |

* cited by examiner

Primary Examiner — Kanji Patel
(74) Attorney, Agent, or Firm — Jeffrey T. Knapp

(57) ABSTRACT

An exemplary method for increasing brightness of an image captured in low light includes: transforming the captured image into an original image that has a brightness component; copying the brightness component of the original image as a brightness image; inverting the brightness image into a negative image; and incorporating the negative image into the original image such that a predetermined percentage of gray scale values of pixels of the negative image corresponding to pixels in a dark portion of the original image are respectively added to gray scale values of the pixels in the dark portion of the original image to produce a processed image.

15 Claims, 5 Drawing Sheets

METHOD AND APPARATUS FOR INCREASING BRIGHTNESS OF IMAGE CAPTURED IN LOW LIGHT

BACKGROUND

1. Technical Field

Aspects of the present invention relate to image processing technology and, more specifically, relate to a method and an apparatus for increasing brightness of an image captured in low light.

2. Description of Related Art

An imaging system such as a digital camera, an optical scanner or a video camera uses an image sensor. The image sensor is typically a coupled charge device (CCD) image sensor or a complementary metal oxide semiconductor (CMOS) image sensor. One of the challenges of utilizing the image sensor is to capture an image with enough brightness when the object is in a low light environment. Conventionally, this is achieved by turning up the power of gain amplifiers of the image sensor—also known as ISO equivalence of the image system. Thereby, the brightness of the captured image is increased. However, doing so also amplifies any noise in the electrical signals that correspond to the image. This may deteriorate the quality of the captured image. In particular, portions of the unadjusted image that are relatively bright may become too bright after the image signals are amplified.

Therefore, it is desirable to provide a method and an apparatus for increasing brightness of an image captured in low light, which method and apparatus can overcome the above-mentioned problems.

SUMMARY

In a present embodiment, a method for increasing brightness of an image captured in low light is disclosed. The method includes: transforming the captured image into an original image that has a brightness component; copying the brightness component of the original image as a brightness image; inverting the brightness image into a negative image; and incorporating the negative image into the original image such that a predetermined percentage of gray scale values of pixels of the negative image corresponding to pixels in a dark portion of the original image are respectively added to gray scale values of the pixels in the dark portion of the original image to produce a processed image.

BRIEF DESCRIPTION OF THE DRAWINGS

Many aspects of the present embodiments will be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments of the present apparatus and method will now be described in detail with reference to the drawings.

Figure 1:
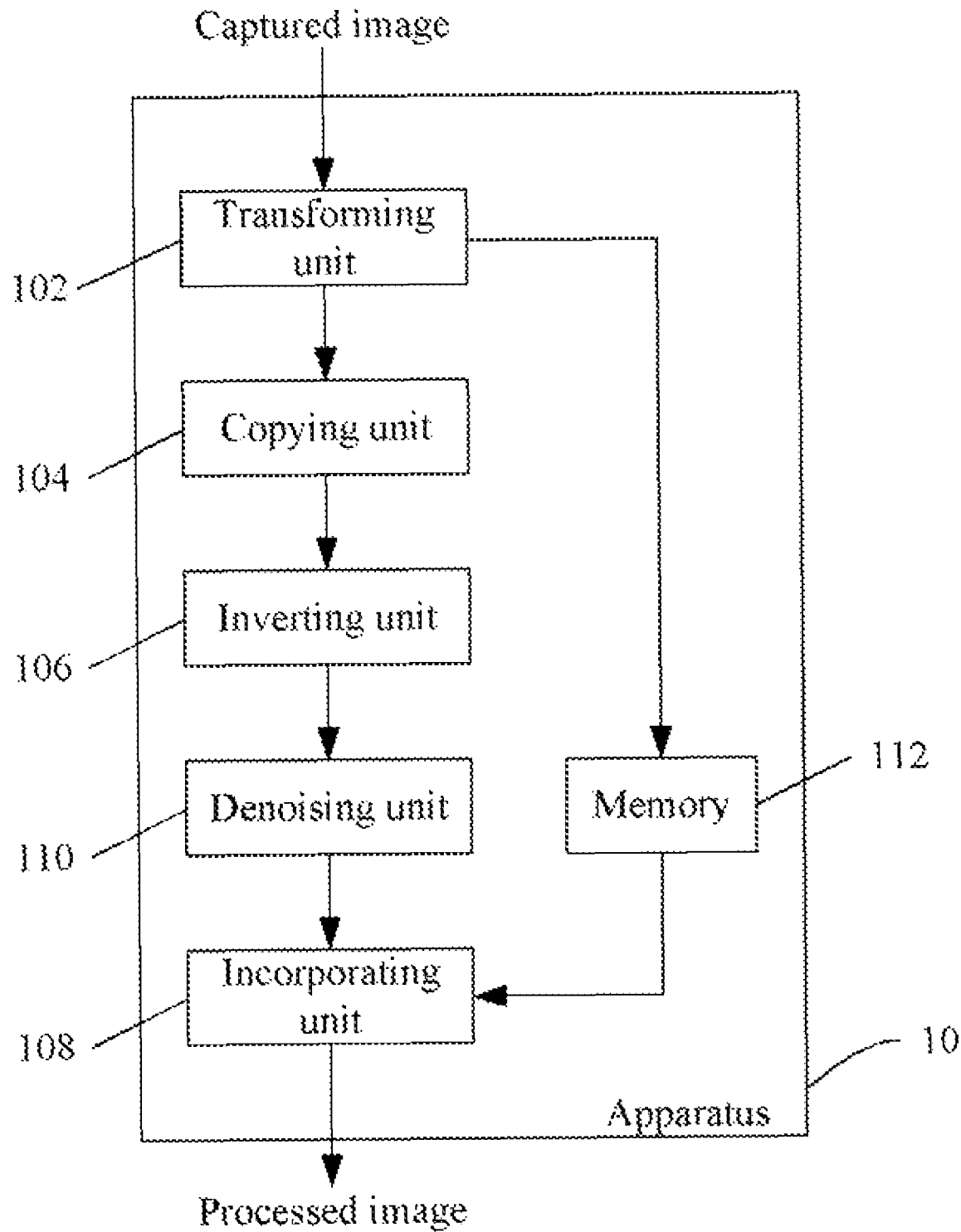
FIG. 1 is a functional block diagram of an apparatus for increasing brightness of an image captured in low light, according to an exemplary embodiment of the present invention.

Referring to FIG. 1, an apparatus 10 for increasing brightness of an image captured in low light is shown. The apparatus 10 includes a transforming unit 102, a copying unit 104, an inverting unit 106, and an incorporating unit 108. The transforming unit 102 is configured to transform the captured image into an original image that has a brightness component. The copying unit 104 is configured to copy the brightness component of the original image as a brightness image. The inverting unit 106 is configured to invert the brightness image into a negative image. The incorporating unit 108 is configured to incorporate the negative image into the original image to produce a processed image. In performing such incorporation, a predetermined percentage of gray scale values of pixels of the negative image corresponding to pixels in a dark portion of the original image are respectively added to gray scale values of the pixels in the dark portion of the original image to produce the processed image.

Preferably, the apparatus 10 further includes a denoising unit 110 and a memory 112. The denoising unit 110 is configured to denoise the negative image before it is incorporated. The memory 112 is configured for storing the original image. The incorporating unit 108 reads the original image from the memory 112 for incorporation of the original image with the denoised negative image.

Figure 2:
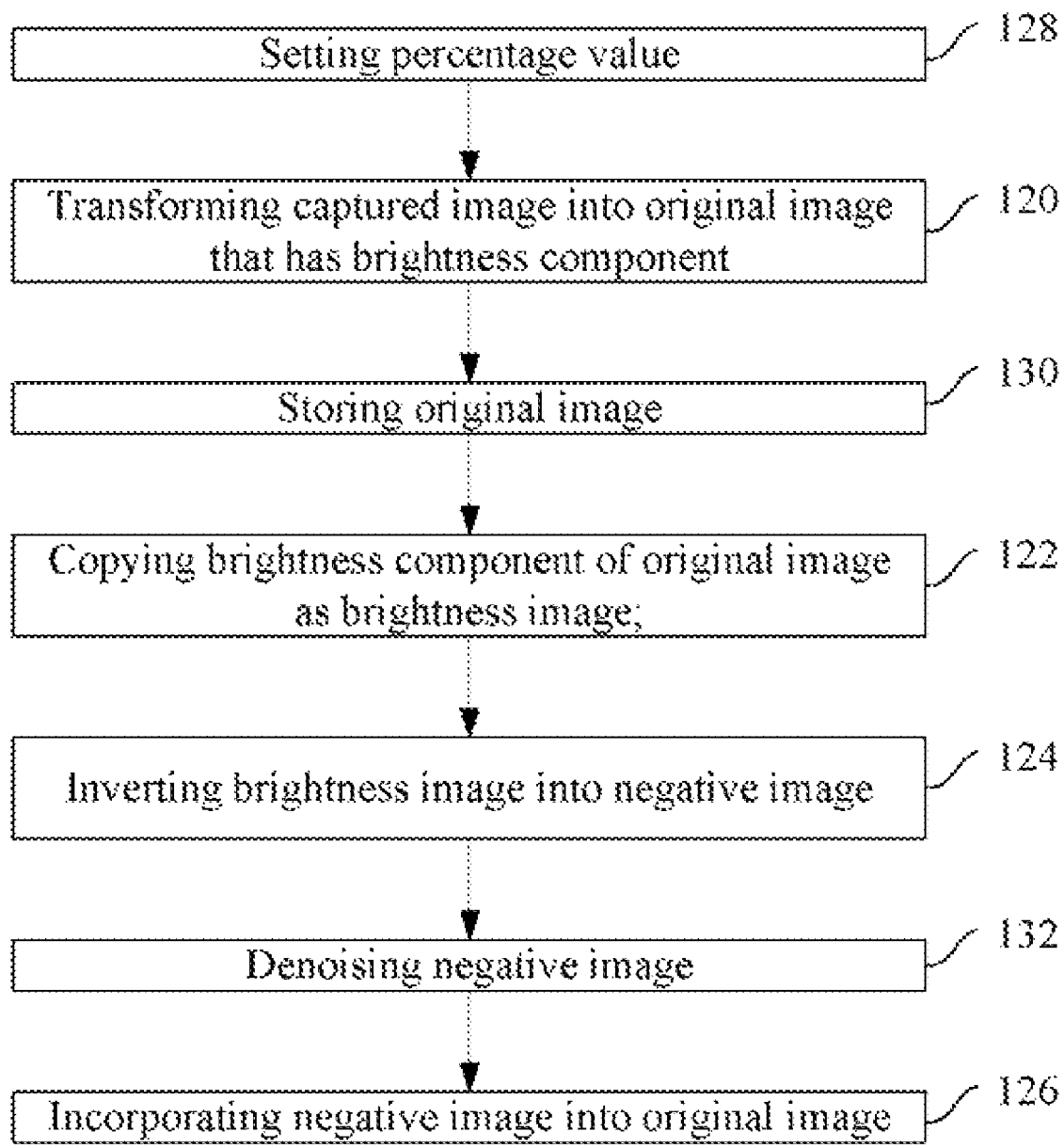
FIG. 2 is a flow chart of a method for increasing brightness of an image captured in low light, according to another exemplary embodiment of the present invention.

Referring to FIG. 2, a method for increasing brightness of a captured image comprises the following operations of:

operation 120: transforming a captured image into an original image;

operation 122: copying the brightness component of the original image as a brightness image;

operation 124: inverting the brightness image into a negative image; and operation 126: incorporating the negative image into the original image such that a predetermined percentage of the gray scale values of the pixels of the negative image corresponding to pixels in the dark portion of the original image are respectively added to the gray scale values of the pixels in the dark portion of the original image to produce the processed image.

Preferably, the method further comprises the following operations of:

operation 128: setting a percentage value that specifies what percentage of the gray scale values of the pixels of the negative image corresponding to the pixels in the dark portion of the original image will be respectively added to the gray scale values of the pixels in the dark portion of the original image before operation 126 (the incorporating operation); in detail, several selectable percentage values, e.g., 1%, 2%, 5%, 8% and 10%, can be predetermined according to user preferences or recommendations of the manufacturer; the selectable percentage values are stored in, e.g., the incorporating unit 108; next, the percentage value is set by choosing one of the selectable percentage values based on a gray scale histogram of the captured image.

operation 130: storing the original image after operation 120 (the transforming operation). In detail, the original image is stored in the memory 112; next, the incorporating unit 108 reads the original image from the memory 112 for incorporation of the original image with the denoised negative image; and operation 132: denoising the negative image before operation 126 (the incorporating operation).

Figure 3:
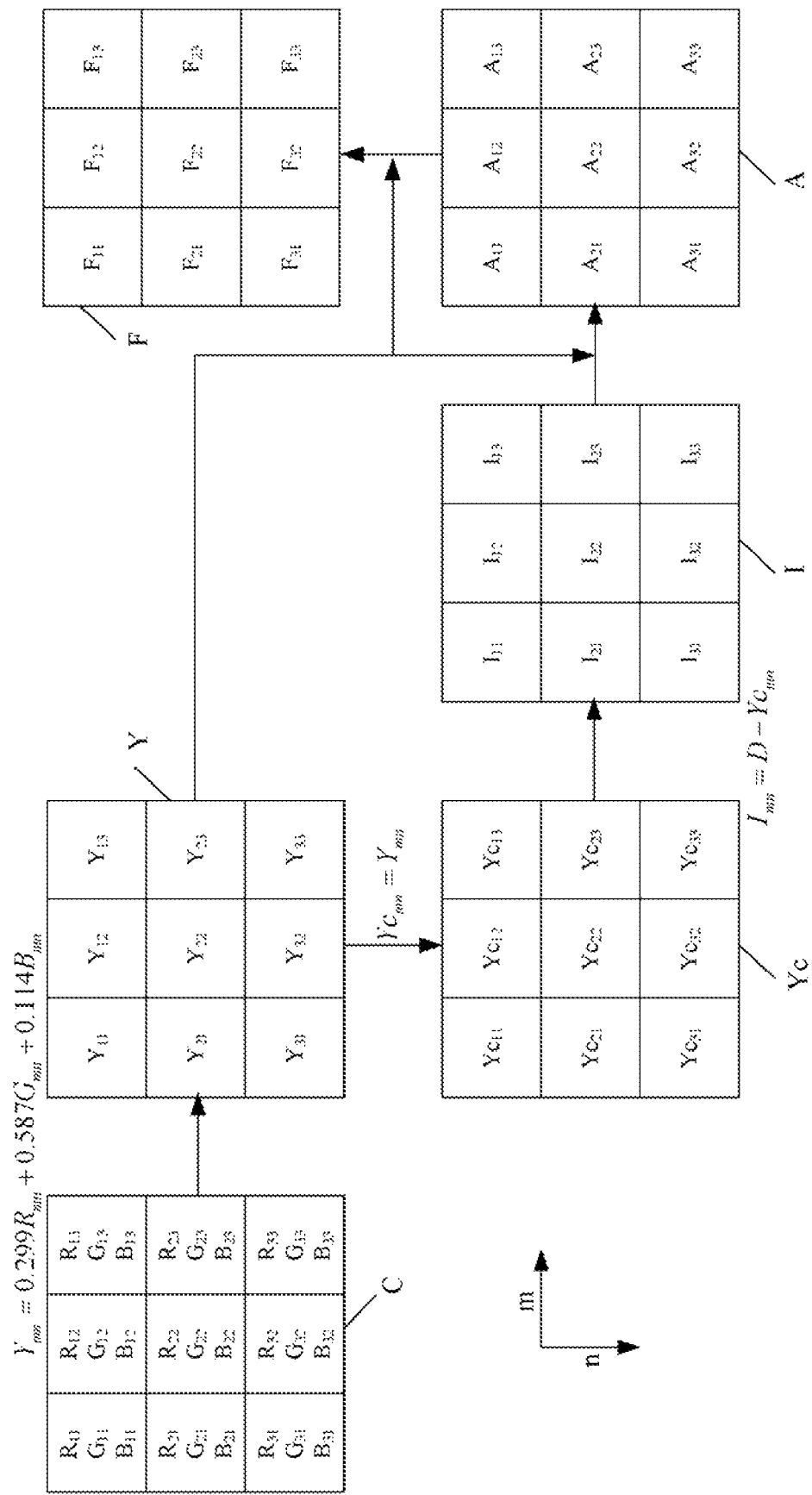
FIG. 3 is a schematic diagram showing a principle of the method of FIG. 2.

Referring also to FIG. 3, a more detailed description of the apparatus 10 and the method are given below to provide a better understanding of the exemplary embodiments. As illustrated in FIG. 3, "C", "Y", "Yc", "I", "A", and "F" respectively represent the captured image C, the original image Y, the brightness image Yc, the negative image I, the denoised negative image A, and the processed image F. It is assumed that the captured image C generated by an image sensor is composed of three color components, i.e., red (R), green (G), and blue (B) components. Therefore, a pixel of the captured image C at the intersection of line m and row n (m, n are positive integers) is represented by three chromaticity values $R_{mn}$, $G_{mn}$, $B_{mn}$. $Y_{mn}$, $Yc_{mn}$, $I_{mn}$, $A_{mn}$ and $F_{mn}$ respectively represent the gray scale value of a pixel of the original image Y, the brightness image Yc, the negative image I, the denoised negative image A, and the processed image F at the intersection of line m and row n. It should be understood that though only nine (3×3) pixels are shown in FIG. 3, the number of pixels of an actual image is usually far greater than nine.

In operation 122 (the transforming operation), the transforming unit 102 transforms the captured image C into the original image Y, and one of the equations used by the transforming unit 102 is:

$$Y_{mn}=0.299R_{mn}+0.587G_{mn}+0.114B_{mn}.$$

In operation 124 (the copying operation), the copying unit 104 copies the brightness component of the original image Y as the brightness image Yc using the equation:

$$Yc_{mn}=Y_{mn}.$$

In operation 126 (the inverting operation), the inverting unit 106 inverts the brightness image Yc into the negative image I using the equation:

$$I_{mn}=D-Yc_{mn},$$

where D is a positive integer, and represents the highest gray scale value the image sensor 20 can generate. For example, D=255 or D=4095.

Figure 4:
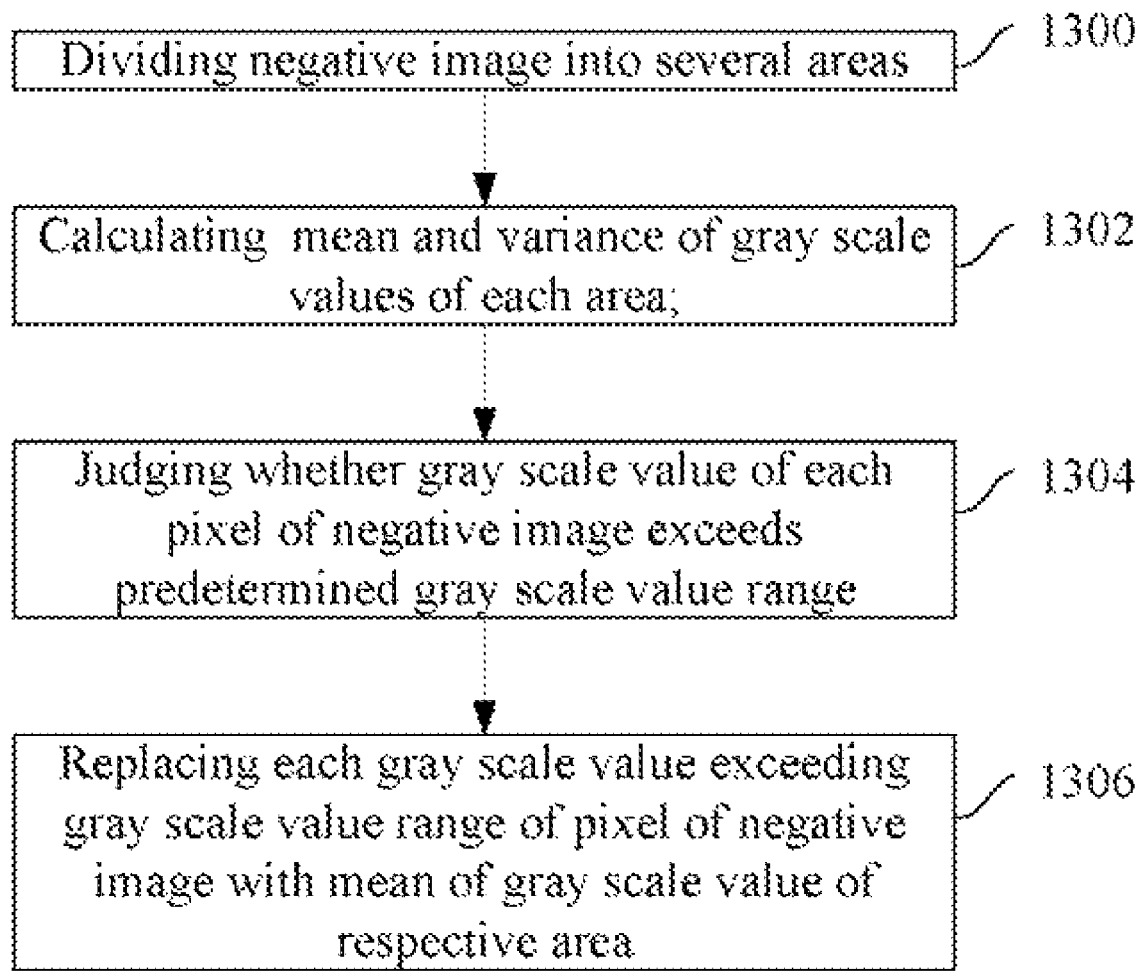
FIG. 4 is a flow chart of details of a denoising step of the method of FIG. 2.

Referring to FIG. 4, in operation 130 (the denoising operation), the denoising unit 110 denoises the negative image I to obtain the denoised negative image A. The denoising unit 110 can be a mean filter or a median filter. The denoising unit 110 of this exemplary embodiment is an improved mean filter, which denoises the negative image I by the following sub-operations of:

operation 1300: dividing the negative image I into several areas.

operation 1302: calculating the mean and variance of gray scale values of each area.

operation 1304: judging whether the gray scale value of each pixel of the negative image I exceeds a gray scale value range from "$\bar{v}-k\sigma$" to "$\bar{v}+k\sigma$", where k is a positive number, and satisfies the equation: 0<k<3, and "$\bar{v}$", "$\sigma$" respectively represent the mean and variance of gray scale value of the area the respective pixel belongs to. This operation is for judging whether a pixel is a noised pixel according to the fact that a distribution of gray scale values of each area is typically a normal distribution. That is, gray scale values of normal pixels should be in the range from "$\bar{v}-k\sigma$" to "$\bar{v}+k\sigma$". As will be understood by those skilled in the art, k can be determined based on the quality requirements of the processed image.

Operation 1306: replacing each gray scale value exceeding the gray scale value range from "$\bar{v}-k\sigma$" to "$\bar{v}+k\sigma$" of a pixel of the negative image I with "$\bar{v}$". This operation replaces the gray scale value of each noised pixels with the respective mean of gray scale values of the area the noised pixel belongs to.

The improved mean filter only filters the noised pixels, and keeps the normal pixels unchanged to minimize loss of image details caused by operation 132 (the denoising operation).

Figure 5:
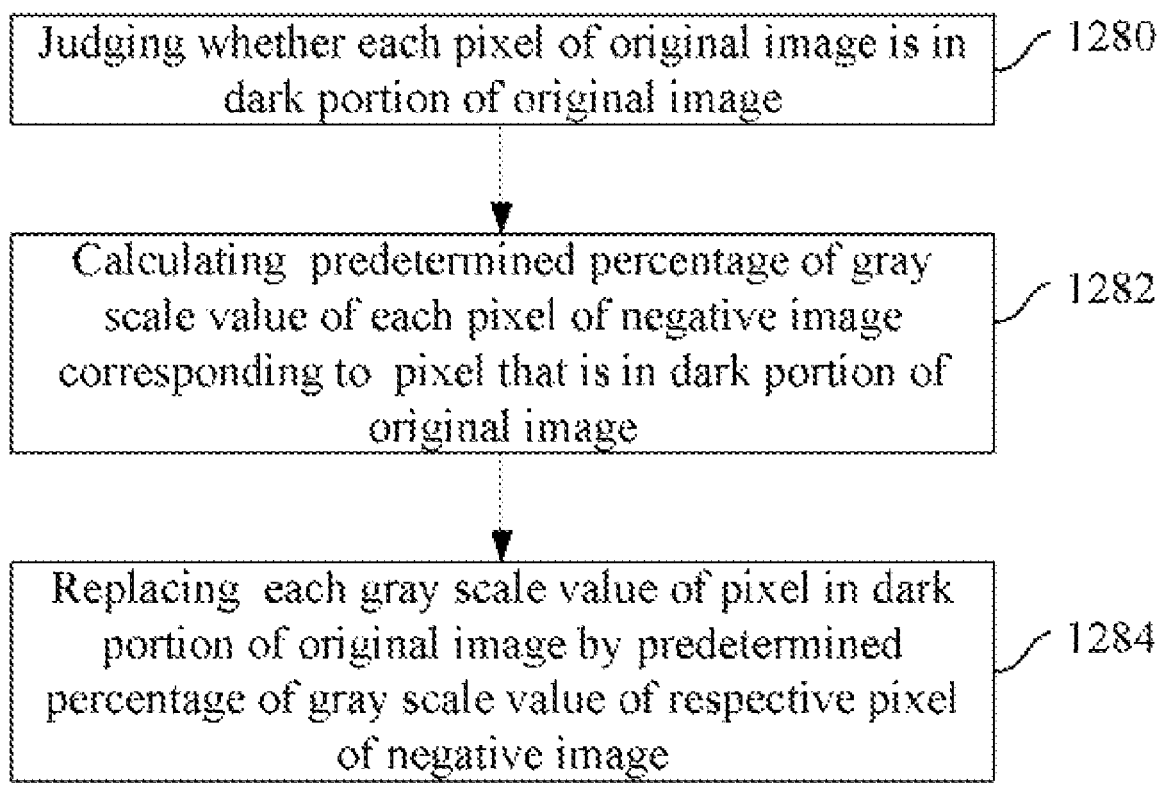
FIG. 5 is a flow chart of details of another step of the method of FIG. 2, namely incorporating a negative image into an original image.

Referring to FIG. 5, in operation 128 (the incorporating operation), the incorporating unit 108 incorporates the negative image I into the original image R. In detail, this operation is implemented by the following sub-operations of:

operation 1280: judging whether a pixel of the original image R is in the dark portion of the original image R. Specifically, whether a pixel of the original image R is in the dark portion of the original image R can be judged by determining whether the gray scale value of the pixel is in the gray scale value range of the dark portion. For example, the gray scale value range may be 0~31 D/256.

operation 1282: calculating the predetermined percentage of gray scale value of each pixel of the negative image I corresponding to a pixel that is in the dark portion of the original image R.

operation 1284: replacing each gray scale value of a pixel in the dark portion of the original image R with the predetermined percentage of gray scale value of the respective pixel of the negative image.

The apparatus 10 and the method only increase the brightness of the dark portion of the captured image C, by incorporating the negative image I into the original image Y. Unlike with conventional apparatuses and methods, there are undue noise amplification problems or excessive image brightness problems.

Various components of the apparatus 10, as shown in FIG. 1, can be integrated into a single control unit. For example, the transforming unit 102, the copy unit 104, the inverting unit 106, the incorporating unit 108, and the denoising unit 110 can be integrated into a single control unit. Alternatively, such components can be implemented in a software algorithm or in hardware, such as, for example, a field programmable gate array (FPGA) or an application specific integrated circuit (ASIC). In addition, the operations of FIG. 2 may be performed by the same control unit, or by a processor executing instructions organized into a program module or a custom designed state machine. As such, it is intended that the processes described herein be broadly interpreted as being equivalently performed by software, hardware, or a combination thereof. As indicated above, appropriate software modules can be written via a variety of software languages, including C, C++, Java, Visual Basic, and many others. These software modules may include data and instructions which can also be stored on one or more machine-readable storage media, such as: dynamic or static random access memories (DRAMs or SRAMs), erasable and programmable read-only memories (EPROMs), electrically erasable and programmable read-only memories (EEPROMs), and flash memories; magnetic disks such as fixed, floppy, and removable disks; other magnetic media including tape; and optical media such as compact discs (CDs), and digital video discs (DVDs). Instructions of the software routines or modules may also be loaded or transported into wireless cards or any of various computing devices operating on a wireless network in any one of many different ways. For example, code segments including instructions stored on floppy disks, CD or DVD media, a hard disk, or transported through a network interface card, modem, or other interface device may be loaded into the apparatus 10 and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be preferred and exemplary embodiments of the present invention, it will be understood by those skilled in the art and as technology develops that various changes and modifications may be made, and equivalents may be substituted for elements thereof without departing from the true scope of the present invention. Many modifications, permutations, additions and sub-combinations may be made to adapt the teachings of the present invention to a particular situation without departing from the scope of the present invention. Accordingly, it is intended that the present invention not be limited to the various embodiments disclosed, but rather that the present invention includes all embodiments falling within the scope of the appended claims.

What is claimed is:

1. A method for increasing brightness of an image captured in low light, the method comprising:

transforming the captured image into an original image, the original image comprising a brightness component;

copying the brightness component of the original image as a brightness image;

inverting the brightness image into a negative image; and incorporating the negative image into the original image such that a predetermined percentage of gray scale values of pixels of the negative image corresponding to pixels in a dark portion of the original image are respectively added to gray scale values of the pixels in the dark portion of the original image to produce a processed image.

2. The method as claimed in claim 1, further comprising:

setting a percentage value that determines what percentage of the gray scale values of the pixels of the negative image corresponding to the pixels in the dark portion of the original image will be respectively added to the gray scale values of the pixels in the dark portion of the original image before the negative image is incorporated into the original image.

3. The method as claimed in claim 2, further comprising conducting an experiment to determine a plurality of selectable proportion values, and storing the selectable proportion values, and wherein setting the percentage value comprises choosing one of the selectable proportion values based on a gray scale histogram of the captured image.

4. The method as claimed in claim 3, wherein the proportion values comprise 1%, 2%, 5%, 8%, and 10%.

5. The method as claimed in claim 1, wherein the captured image is transformed into the original image using the equation:

$$Y_{mn}=0.299R_{mn}+0.587G_{mn}+0.114B_{mn},$$

where $R_{mn}$, $G_{mn}$, $B_{mn}$ respectively represent three chromaticity values of a pixel of the captured image at the intersection of line m and row n of an array of pixels of the captured image, $Y_{mn}$ is the gray scale value of a pixel of the original image at the intersection of line m and row n of an array of pixels of the original image, and m and n are positive integers.

6. The method as claimed in claim 1, further comprising storing the original image.

7. The method as claimed in claim 1, further comprising denoising the negative image before the negative image is incorporated into the original image.

8. The method as claimed in claim 7, wherein denoising the negative image comprises:

dividing the negative image into several areas;

calculating the mean and variance of gray scale values of each area;

judging whether the gray scale value of each pixel of the negative image exceeds an gray scale value range from "$\bar{v}-k\sigma$" to "$\bar{v}+k\sigma$", where k a positive number, and satisfies the equation: $0<k<3$, and "v" and "σ" respectively represent the mean and variance of gray scale values of the area the respective pixel belongs to; and replacing each gray scale value exceeding the gray scale value range from "$\bar{v}-k\sigma$" to "$\bar{v}+k\sigma$" with "$\bar{v}$".

9. The method as claimed in claim 1, wherein incorporating the negative image into the original image comprises:

judging whether each pixel of the original image is in the dark portion of the original image;

calculating the predetermined percentage of gray scale value of each pixel of the negative image corresponding to a pixel that is in the dark portion of the original image; and replacing each gray scale value of a pixel in the dark portion of the original image with the predetermined percentage of gray scale value of the respective pixel of the negative image.

10. An apparatus for increasing brightness of an image captured in low light, the apparatus comprising:

a memory;

a transforming unit configured to transform the captured image into an original image and storing the original image in the memory, the original image comprising a brightness component;

a copying unit configured to copy the brightness component of the original image as a brightness image;

an inverting unit configured to invert the brightness image into a negative image; and an incorporating unit configured to incorporate the negative image into the original image such that a predetermined percentage of gray scale values of pixels of the negative image corresponding to pixels in a dark portion of the original image are respectively added to gray scale values of the pixels in the dark portion of the original image to produce a processed image.

11. The apparatus as claimed in claim 10, wherein the transforming unit transforms the captured image into the original image using the equation:

$$Y_{mn}=0.299R_{mn}+0.587G_{mn}+0.114B_{mn},$$

where $R_{mn}$, $G_{mn}$, $B_{mn}$ respectively represent three chromaticity values of a pixel of the captured image at the intersection of line m and row n of an array of pixels of the captured image, $Y_{mn}$ is the gray scale value of a pixel of the original image at the intersection of line m and row n of an array of pixels of the original image, and m and n are positive integers.

12. The apparatus as claimed in claim 10, wherein the incorporating unit stores a plurality of selectable percentage values therein, and one of the selectable percentage values is chosen as the predetermined percentage.

13. The apparatus as claimed in claim 10, further comprising a denoising unit configured to denoise the negative image before the negative image is incorporated into the original image.

14. The apparatus as claimed in claim 13, wherein the denoising unit is selected from the group of a mean filter and a median filter.

15. The apparatus as claimed in claim 10, wherein the incorporating unit is further configured to read the original image from the memory.

* * * * *